United States Patent
O'Leary et al.

(10) Patent No.: US 12,115,719 B2
(45) Date of Patent: Oct. 15, 2024

(54) SYSTEMS AND METHOD FOR ADDITIVE MANUFACTURING OF DENTAL DEVICES USING PHOTOPOLYMER RESINS

(71) Applicant: ALIGN TECHNOLOGY, INC., San Jose, CA (US)

(72) Inventors: Siobhan O'Leary, Santa Clara, CA (US); Peter Webber, San Mateo, CA (US); Michael Christopher Cole, Longmont, CO (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 241 days.

(21) Appl. No.: 16/942,330

(22) Filed: Jul. 29, 2020

(65) Prior Publication Data

US 2021/0030516 A1    Feb. 4, 2021

Related U.S. Application Data

(60) Provisional application No. 62/879,845, filed on Jul. 29, 2019.

(51) Int. Cl.
| | |
|---|---|
| *B29C 64/124* | (2017.01) |
| *A61C 7/08* | (2006.01) |
| *A61C 7/14* | (2006.01) |
| *A61C 13/00* | (2006.01) |
| *B29C 64/393* | (2017.01) |
| *B33Y 10/00* | (2015.01) |
| *B33Y 50/02* | (2015.01) |
| *B33Y 80/00* | (2015.01) |
| *A61C 7/00* | (2006.01) |

(52) U.S. Cl.
CPC .............. *B29C 64/124* (2017.08); *A61C 7/08* (2013.01); *A61C 7/146* (2013.01); *A61C 13/0019* (2013.01); *B29C 64/393* (2017.08); *B33Y 10/00* (2014.12); *B33Y 50/02* (2014.12); *B33Y 80/00* (2014.12); *A61C 7/002* (2013.01)

(58) Field of Classification Search
None
See application file for complete search history.

(56) References Cited

U.S. PATENT DOCUMENTS

| | | | |
|---|---|---|---|
| 5,340,656 A * | 8/1994 | Sachs | B22F 3/004 |
| | | | 347/1 |
| 5,868,138 A | 2/1999 | Halstrom | |
| 5,965,079 A | 10/1999 | Manners | |
| 6,210,162 B1 | 4/2001 | Chishti et al. | |

(Continued)

FOREIGN PATENT DOCUMENTS

| | | |
|---|---|---|
| CA | 3008898 A1 | 6/2017 |
| CN | 101917925 A | 12/2010 |

(Continued)

*Primary Examiner* — Christopher T Schatz
(74) *Attorney, Agent, or Firm* — FisherBroyles, LLP

(57) ABSTRACT

Strategies that reduce shrinkage and ultimately warping of parts that are directly fabricated from photopolymer resins. This increases the accuracy of directly fabricated parts, which is essential for patient specific applications. Implementing these strategies can reduce the need for directly fabricated parts to have supporting structures, which can reduce pre-processing and post-processing steps and facilitate an easier route for production level scale of additive manufacturing.

13 Claims, 15 Drawing Sheets

(56) References Cited

U.S. PATENT DOCUMENTS

| | | |
|---|---|---|
| 6,322,728 B1 * | 11/2001 | Brodkin .................. A61K 6/838 |
| | | 264/603 |
| 6,497,574 B1 | 12/2002 | Miller |
| 6,749,414 B1 | 6/2004 | Hanson et al. |
| 6,957,118 B2 | 10/2005 | Kopelman et al. |
| 6,976,627 B1 | 12/2005 | Culp et al. |
| 7,092,784 B1 | 8/2006 | Simkins |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,892,474 B2 | 2/2011 | Shkolnik et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,943,386 B2 | 4/2018 | Webber et al. |
| 9,943,991 B2 | 4/2018 | Tanugula et al. |
| 10,336,102 B2 | 7/2019 | Cole |
| 10,495,973 B2 | 12/2019 | Cole |
| 10,783,629 B2 | 9/2020 | Parpara et al. |
| 10,888,395 B2 | 1/2021 | Kopelman |
| 2004/0056378 A1 | 3/2004 | Bredt et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2010/0262272 A1 | 10/2010 | Shkolnik et al. |
| 2011/0101570 A1 * | 5/2011 | John ..................... B29C 64/124 |
| | | 264/401 |
| 2014/0061974 A1 | 3/2014 | Tyler |
| 2014/0265034 A1 | 9/2014 | Dudley |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0238280 A1 | 8/2015 | Wu et al. |
| 2017/0007360 A1 | 1/2017 | Kopelman et al. |
| 2017/0113411 A1 * | 4/2017 | Watanabe ............. B33Y 30/00 |
| 2020/0078137 A1 | 3/2020 | Chen et al. |
| 2020/0130237 A1 | 4/2020 | Mojdeh et al. |
| 2020/0160497 A1 | 5/2020 | Shah et al. |
| 2020/0214801 A1 | 7/2020 | Wang et al. |
| 2020/0290262 A1 | 9/2020 | Aguilar Mendez et al. |
| 2020/0306017 A1 | 10/2020 | Chavez et al. |
| 2020/0311934 A1 | 10/2020 | Cherkas et al. |
| 2020/0316856 A1 | 10/2020 | Mojdeh et al. |

FOREIGN PATENT DOCUMENTS

| | | |
|---|---|---|
| CN | 104434323 A | 3/2015 |
| CN | 107847299 A | 3/2018 |
| CN | 109311225 A | 2/2019 |
| DE | 102016224060 A1 | 6/2018 |
| JP | 2003181942 A | 7/2003 |

\* cited by examiner

SYSTEMS AND METHOD FOR ADDITIVE MANUFACTURING OF DENTAL DEVICES USING PHOTOPOLYMER RESINS

RELATED APPLICATIONS

This application claims the benefit under 35 U.S.C. § 119(e) of U.S. Provisional Patent Application No. 62/879,845, filed Jul. 29, 2019, and titled "STRATEGIES TO COMBAT THE EFFECT OF SHRINKAGE IN PHOTOPOLYMER RESINS," the entire contents of which are hereby incorporated by reference in its entirety.

BACKGROUND

Additive manufacturing has been used in many fields. One promising application is the manufacturing of oral appliances and components. However, some aspects of additive manufacturing have made this approach less than ideally suited for at least some oral appliances. For example, directly fabricated polymers may have less than ideal strength and can warp in at least some instances.

Generally, when directly fabricating photopolymers, the amount of light energy delivered to the initial layers can be substantially greater than the amount of light energy used to fabricate the rest of the part. The amount of light energy is related to the amount of polymer cross linking in the directly fabricated photopolymer. The light energy may be increased for the first layers to increase adhesion between the photopolymer and a fabricate platform. If the initial layers, also referred to as the 'burn in' layers, do not provide adequate adhesion, the part may not the fabricated successfully. The light energy can also be increased for the initial layers to compensate for inaccuracies in the initial levelling process, in which the application platform is less than ideally aligned with the optical beam components used to fabricate the layers. The light energy may reduce for the remaining layers, which can be directly fabricated with similar amounts of light energy.

Changing the amount of light energy among the layers can cause warpage of the part in at least some instances. Delivering different amounts of light energy to different layers typically results in different amounts of crosslinking in the layers. The photopolymers can shrink when cured, and the amount of shrinkage can be related to the amount of cross-linking. Varying amounts of crosslinking and curing may produce different levels of shrinkage within a part. The differing amounts of shrinkage can lead to the development of internal stresses within the part that may manifest as warpage or curling.

This effect can be further enhanced with directly fabricated parts in which the lateral dimensions of the part along the build platform area are large compared to the thickness of the part along the fabrication direction. Additionally, structures that are located away from the build platform may experience movement as the base structure warps. To decrease these effects, parts can be suspended away from the build platform and held there by thin pillars that join the part to the platform. However, such pillars may take additional time to fabricate and may be removed in a subsequent manufacturing step, increasing the time and complexity of the manufacturing process.

In light of the above, there is a need for improved methods and apparatus for deposition manufacturing and for parts that can be manufactured with decreased warpage. Ideally, such methods, apparatus and parts will overcome at least some of the aforementioned limitations of the prior approaches.

SUMMARY

The methods and apparatus disclosed herein allow manufacturing of oral appliances such as dental devices with fewer steps and decreased deformation such as warpage. The methods and apparatus allow directly fabricating oral devices that reduce warpage when directly fabricated directly to a build platform. In some embodiments, an oral appliance comprises an elongate structure with a surface directly fabricated on a platform of a additive manufacturing machine, such as a 3D printer, in which the oral appliance comprises one or more structures to decrease deformation and decrease manufacturing steps, such as the removal of standoffs.

In a first aspect, an oral device comprises a plurality of layers of cured photopolymer material forming a body, in which the body comprises a lower substantially planar surface and an upper surface, in which at least one of the plurality of layers inhibits warpage of the body.

In some embodiments, the oral device further comprises at least one support and at least one attachment for a tooth, in which the at least one attachment for the tooth is coupled to the body by the at least one support.

In some embodiments, each of the plurality of layers has been cured to have a similar amount of polymer cross-linking. In some embodiments, each layer of the plurality of layers has an amount of polymer cross-linking within a range of about 90% and 110% of an average amount of polymer cross-linking of the plurality of layers. In some embodiments, each of the plurality of layers has a similar amount of polymer cross-linking suitable for adhering to a build platform.

In some embodiments, a first layer of the planar surface and a second layer spaced from the first layer each have an amount of polymer cross-linking greater than an amount of polymer cross-linking of an inner plurality of layers between the first layer and the second layer. The first layer and the second layer can have a similar amount of polymer cross-linking, and each layer of the inner plurality of layers can have a similar amount of polymer cross-linking. In some embodiments, each layer of the inner plurality of layers has an amount of polymer cross-linking between 90% and 110% of an average amount of polymer cross-linking of the plurality of layers, and the first layer and the second layer each has an amount of polymer cross-linking between 90% and 110% of an average amount of polymer cross-linking of the first layer and the second layer, in which the average of the inner plurality of layers is less than the average of the first layer and the second layer by at least about 10%.

In some embodiments, the body has a width, a length, and a thickness and the thickness is at least 0.25 times the length of the body. In some embodiments, the thickness is no more than 0.25 times the length of the body.

In some embodiments, the lower surface comprises a pattern of platforms defined with a plurality of grooves in the substantially planar surface. The pattern may comprise one or more of a checkerboard pattern, a tile pattern, and a stripe pattern. In some embodiments, the platforms cover between twenty-five percent and seventy-five percent of a surface area bounded by an outer perimeter of the pattern of platforms. In some embodiments, the platforms comprise a taper that widens from a face of a platform towards the upper surface.

In some embodiments, the lower surface has a pattern comprising areas of resin having a higher amount of polymer cross-linking and areas of resin having a lower amount of polymer cross-linking.

In some embodiments, the body comprises an attachment for a tooth. The attachment for the tooth may comprise a substantially flat surface for engaging the tooth and the substantially flat surface comprises the substantially planar surface.

In some embodiments, the body comprises an elongate structure operable to position an attachment for a tooth. In some embodiments, the body has a length and a width, and the length is at least four times the width. The oral device may comprise a registration structure for positioning the oral device and a support structure coupling the registration structure to the body, in which the registration structure and the attachment couple to opposite sides of the oral device. In some embodiments, the at least one layer to inhibit warpage extends through two or more of the body, the support structure, or the support. In some embodiments, cured layer extends through the attachment and the registration structure.

In another aspect, a method of manufacturing an oral device comprises forming a plurality of layers of resin to form a body having a lower, planar surface and an upper surface. The lower substantially planar surface is directly fabricated directly to a platform and at least one of the plurality of layers inhibits warpage of the body.

In some embodiments, the oral device comprises at least one attachment and at least one support coupling the attachment to the body and the method further includes directly fabricating a plurality of support layers to form the support and a plurality of attachment layers to form the attachment.

In some embodiments, the method further comprises fabricating each of the plurality of layers with a same amount of polymer cross-linking. In some embodiments, the method further comprises directly fabricating a first layer at the planar surface and a second layer at the upper surface with a greater amount of polymer cross-linking than an amount of polymer cross-linking of an inner plurality of layers between the first layer and the second layer. In some embodiments, the method further comprises directly fabricating the first layer and the second layer with a similar amount of polymer cross-linking. In some embodiments, the method further includes directly fabricating each layer of the inner plurality of layers with a similar amount of polymer cross-linking.

In some embodiments, the body has a width, length, and thickness and the thickness is at least 0.25 times the length of the body.

In some embodiments, the method further comprises directly fabricating the lower surface with a pattern of platforms. The pattern may comprise one or more of a checkerboard pattern, a tile pattern, or a stripe pattern. In some embodiments, the method comprises directly fabricating the platforms to have an area between twenty-five percent and seventy-five percent of a perimeter bounded by the plurality of platforms. In some embodiments, the method further includes directly fabricating the platforms to have a taper that widens from a face of a platform towards the upper surface. In some embodiments, the lower surface has a pattern including areas of resin having a high amount of polymer cross-linking and areas of resin having a lower amount of polymer cross-linking. In some embodiments, the pattern comprises one or more of a checkerboard pattern, a tile pattern, or a stripe pattern.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
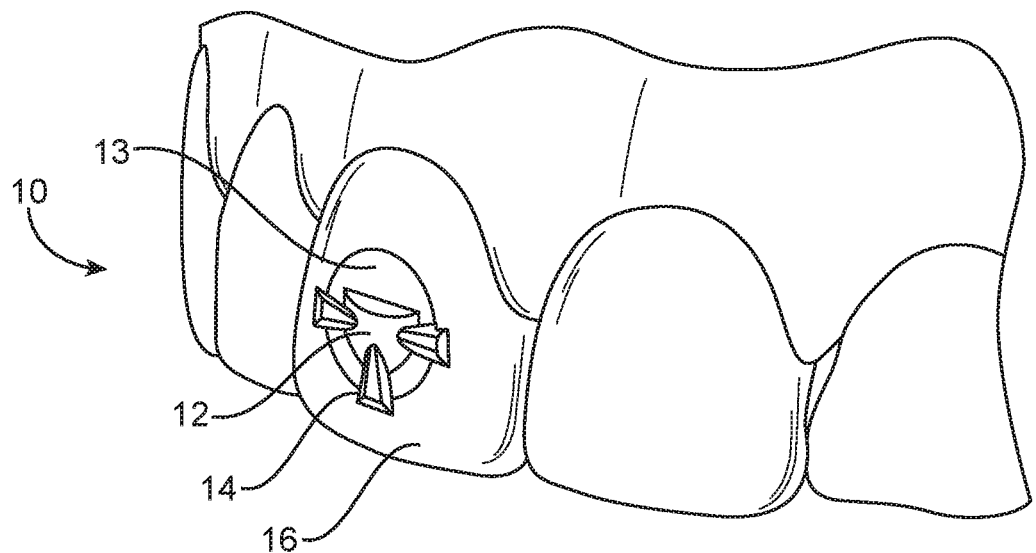
FIG. 1 shows an example of a dental device positioning an orthodontic attachment, in accordance with some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein. The methods, apparatus and dental appliances disclosed herein are well suited for combination with many dental appliances and applications, such as an aligner for aligning a plurality of teeth, a retainer, a palatal expander, a bracket for placing attachments on a plurality of teeth, an attachment for coupling to teeth, a nightguard, a functional appliance, and a directly fabricated aligner thermoforming mold. The presently disclosed methods, apparatus and appliances are well suited for direct fabrication with deposition manufacturing, sometimes referred to as additive manufacturing or 3D printing, fused deposition modeling, stereo lithography (SLA), digital light projector (DLP) printing, continuous DLP, inkjet spray, and metal printing. Also, the presently disclosed methods and apparatus are well suited for the additive manufacturing of different materials onto a single appliance, such as inkjet printing with a plurality of different materials to fabricate an appliance comprising a plurality of different materials.

In some embodiments, the orthodontic appliances herein (or portions thereof) can be produced using direct fabrication, such as additive manufacturing techniques (also referred to herein as "3D printing"). Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although specific reference is made to oral components, such as orthodontic devices and molds for orthodontic devices, the methods and apparatus disclosed herein will find application many fields such implantable devices, cardiology, orthopedics, and generally product design within the healthcare industry. It may also be useful in other industries such as aviation, automotive, in particular for component fabrication etc.

FIG. 1 illustrates an exemplary dental device 10 for positioning an attachment 12 on a patient's tooth 13. One or more the components of the device 10 can be directly fabricated to inhibit warpage as described herein, and the device 10 may comprise at least one component directly fabricated with at least one layer to inhibit warpage as described herein. The dental device 10 may comprise a body 16, an attachment 12 and one or more supports 14. The dental device 10 can be sized and shaped to be positioned on a plurality of a patient's teeth present in an upper or lower jaw. The body 16 may include many suitable structures for placement on one or more of the patient's teeth, such as a thin shell polymeric appliance comprising a plurality of teeth receiving cavities sized and shaped to receive the patient's teeth. The dental device 10 may couple to the attachment 12 by one or more supports 14, and the body 16 may comprise an opening so as to expose at least a portion of tooth 13 during placement of the attachment 12. In some embodiments, the dental device 10 and the attachment 12 may be formed as a single component. For example, the dental device 10 and the attachment 12 may be directly fabricated at the same time using additive manufacturing as described herein. In other embodiments, some components of the dental device 10 are manufactured separately and coupled together prior to placement on the patient's teeth. For example, a freestanding attachment 12 can be coupled to the supports 14 using conventional joining techniques such as plastic welding or adhesives prior to placing the dental device 10 on the patient's tooth. The attachment 12 coupled to the body 16 prior to placement on the patient's teeth can allow the attachment to be accurately positioned on the patient's tooth. Once the attachment 12 has been appropriately positioned on the patient's tooth, the attachment 12 can be adhered to the tooth. The attachment 12 can be used to apply beneficial forces to the tooth with polymeric shell dental appliances. For example, the attachment can be used with the Invisalign® treatment commercially available from Align Technology.

The described devices and methods are applicable to the direct fabrication of the dental device 10 with the attachment 12 as a single component, direct fabrication of the dental device 10 with the attachment 12 as a separate component, or to the direct fabrication of the attachment 12.

Figure 2:
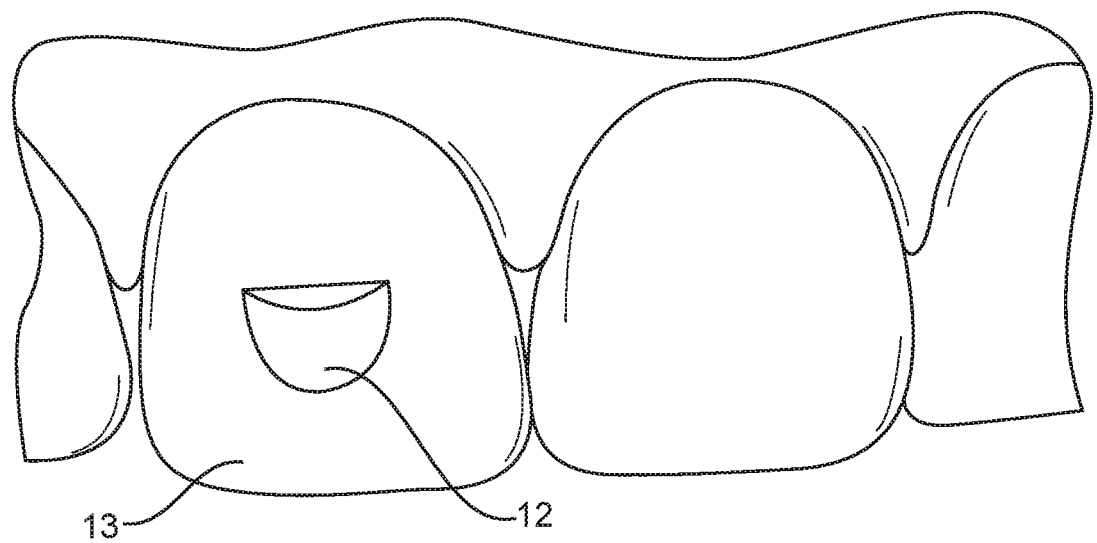
FIG. 2 shows an example of the dental device of FIG. 1 attached to a tooth, in accordance with some embodiments.

FIG. 2 illustrates the attachment 12 secured to a patient's tooth 13. The attachment 12 may be used as an anchor in orthodontic procedures and may enhance the performance of an orthodontic device in the movement of teeth. In some examples, the attachment 12 may be bonded to the tooth by an adhesive. A surface of the attachment 12 may comprise a smooth surface to bond to the tooth, or have a texture to enhance the bonding between the tooth and the attachment 12. The surface bonded to the tooth may have an attachment surface that is complementary to a surface of the tooth to which it is being bonded.

Figure 3:
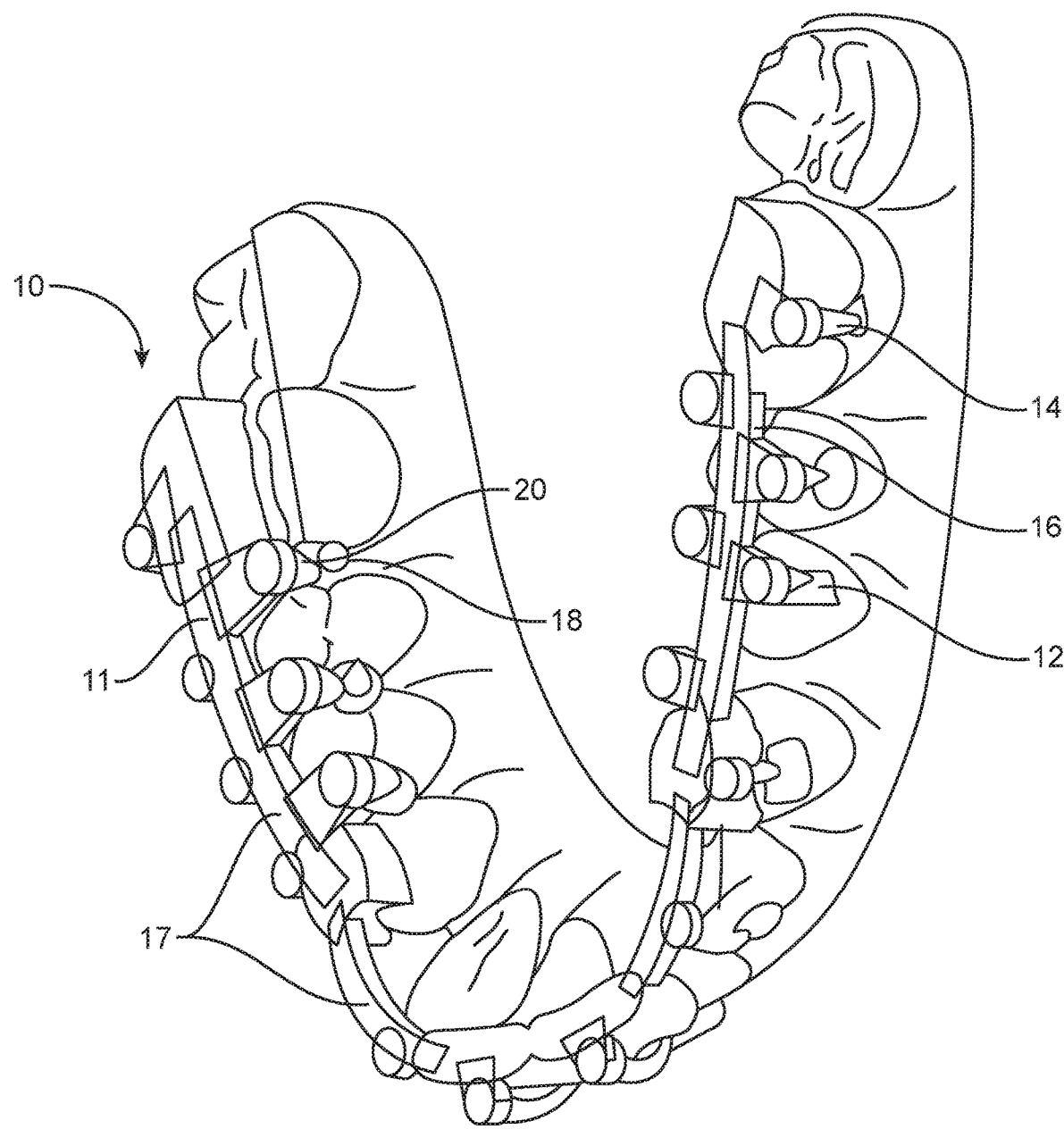
FIG. 3 shows an example of a dental device having registration structures for positioning the dental device relative to a set of teeth, in accordance with some embodiments.

FIG. 3 shows an exemplary dental device 10 placed a patient's teeth. One or more the components of the device 10 can be directly fabricated to inhibit warpage, as described herein, and the device 10 may comprise at least one component fabricated with at least one layer to inhibit warpage, as described herein. The device 10 may comprise a surface 11, which has been directly fabricated on, for example, a stereolithographic 3-D printer. The surface 11 can be located on a side of the dental device opposite a tooth engaging surface of the device. The surface 11 may be located occlusal of the teeth. During fabrication, the surface 11 may be fabricated on a build platform, sometimes referred to a fabrication platform. In some embodiments, the surface 11 may comprise one or more burn in layers, as described herein. The at least one layer to inhibit warpage may comprise structures located in the burn in layer or other layers of the device, e.g. stress relieving structures, or structures located on different layers away from surface 11, as described herein.

The dental device 10 comprises a body 16, a plurality of attachments 12, a plurality of supports 14 that couple the attachments 12 to the body 16, a plurality of registration structures 18, and a plurality of support structures 20 that couple the registration structures 18 to the body 16. The body 16 may comprise one or more elongate structures 17. The body 16 may comprise a single U-shaped component comprising one or more elongate structures 17, or it may comprise a plurality of elongate structures 17 that may be joined together. The locations of each of the plurality of attachments on each of the teeth may be determined by a treatment professional with planning software, and the device 10 directly fabricated in accordance with the positions determined with the treatment planning software.

In use, the body 16 may provide a reference structure for positioning the attachments 12 relative to a patient's teeth while the registration structures 18 may secure and position the body 16 relative to the patient's teeth. While the registration structures can be placed on the patient's teeth in many ways, in some embodiments the registration structures are located on the body 16 for placement at mesial locations on the patient's teeth. The dental device 10 may be positioned in a patient's mouth with the registration structures 18 contacting the patient's teeth to orient the attachments 12 in a predetermined location. With the attachments 12 in the correct location, the attachment 12 may be bonded to the tooth. Once the attachments 12 are bonded to the tooth, the supports 14 may be removed from the attachments 12 freeing the dental device 10 from the patient's teeth. The dental device 10 may then be removed from the patient's mouth leaving the attachments 12 bonded to the patient's teeth in the desired locations, for example the predetermined locations.

In some embodiments, the elongate body 16 comprises one or more structures to decrease deformation, as described herein, to place the attachments 12 at the appropriate positions on the patient's teeth. For example, the one or more elongate structures 17 of body 16 may comprise the one or more structures to decrease deformation, as described herein, to place attachments 12 at the appropriate locations on the patient's teeth. While the one or more structures to decrease deformation can be configured in many ways, in some embodiments, the surface 11 comprises a plurality of stress relieving structures, such as a plurality of platforms. Alternatively or in combination, the elongate structures 17 may comprise a layer to inhibit warpage of the surface 11, such as an opposing layer with a similar amount cross-lining and light exposure as the burn in layer of surface 11.

Figure 4:
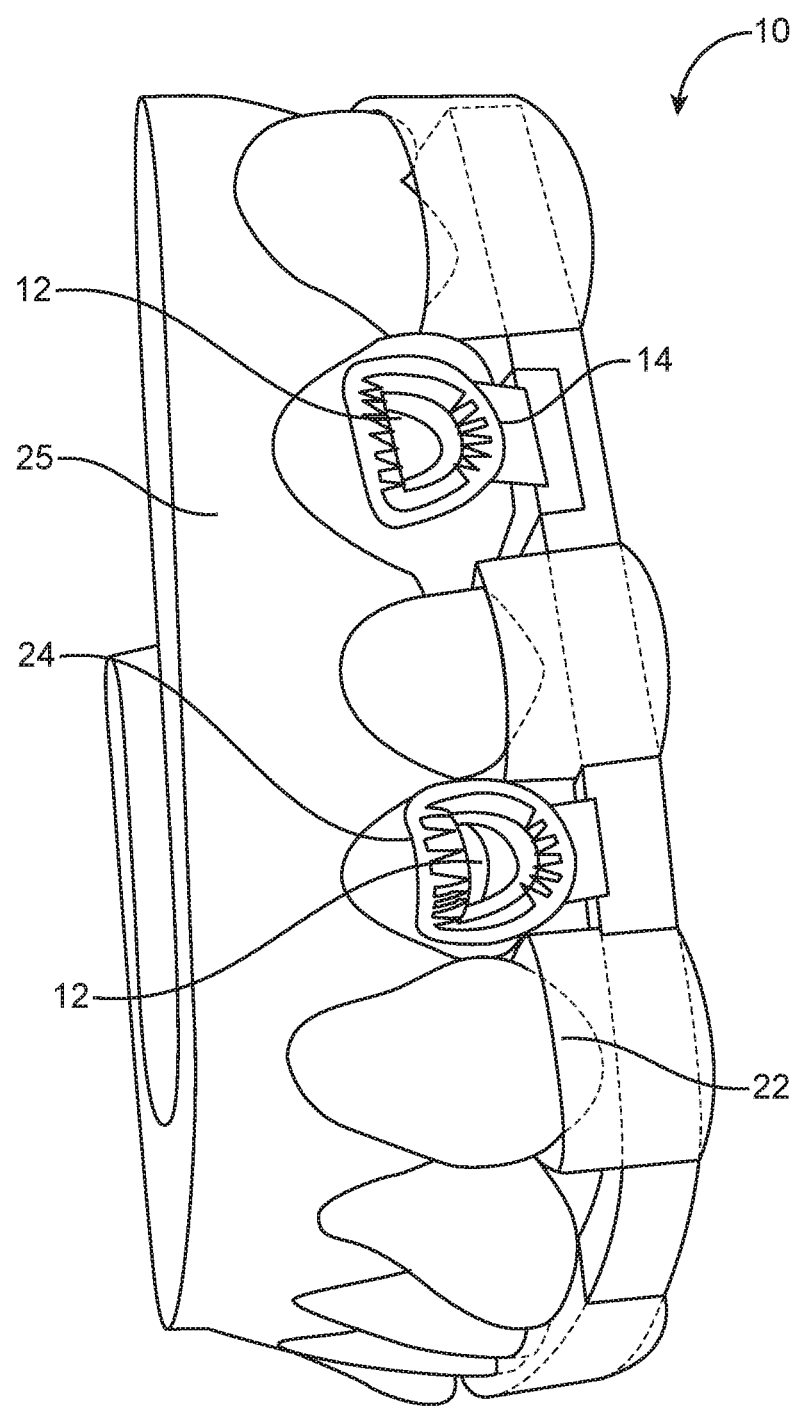
FIG. 4 shows an example dental device positioning orthodontic attachments on a set of teeth, in accordance with some embodiments.
Figure 5:
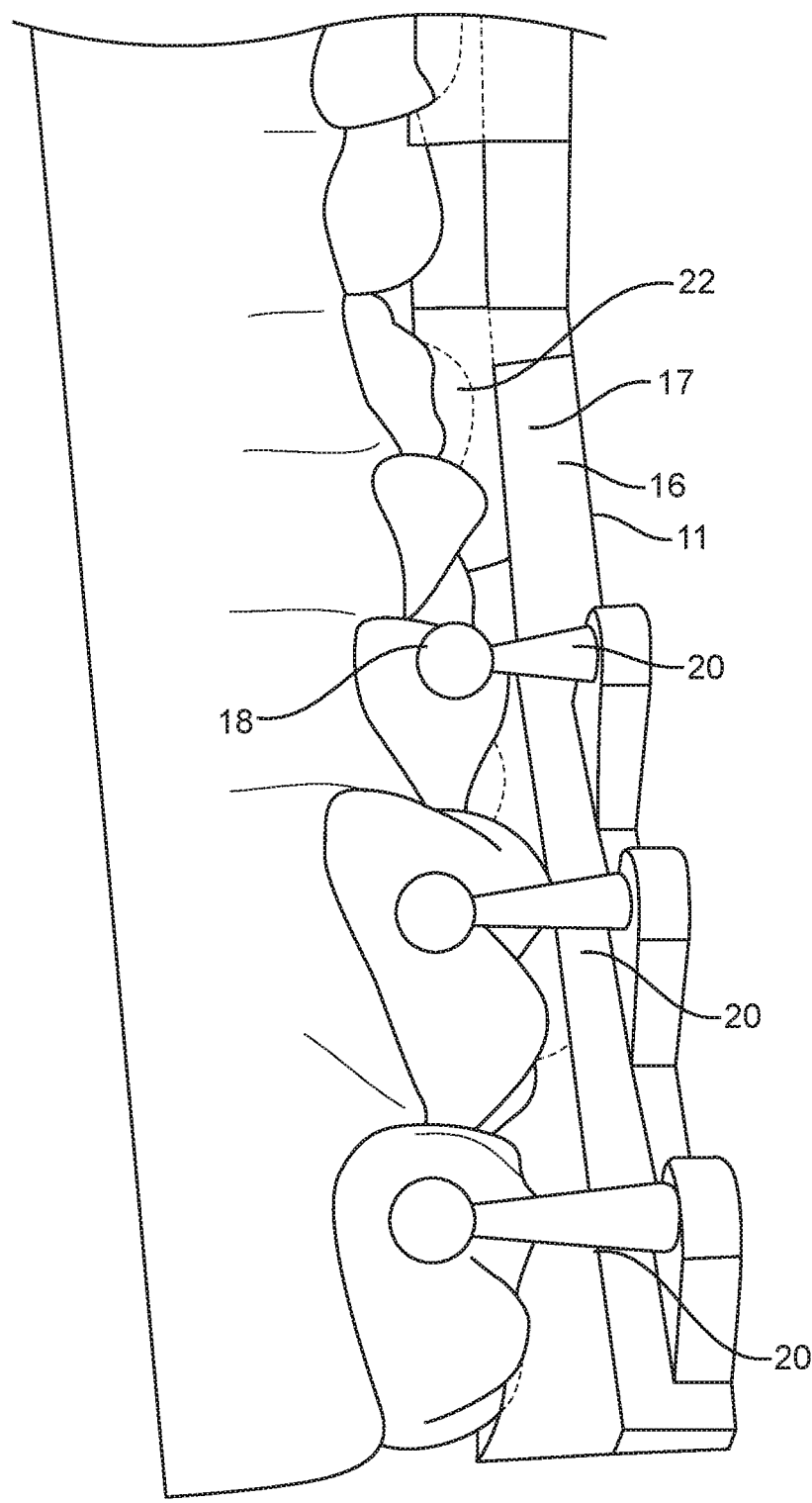
FIG. 5 shows an example of a dental device having registration structures for positioning dental device on a set of teeth, in accordance with some embodiments.
Figure 6:
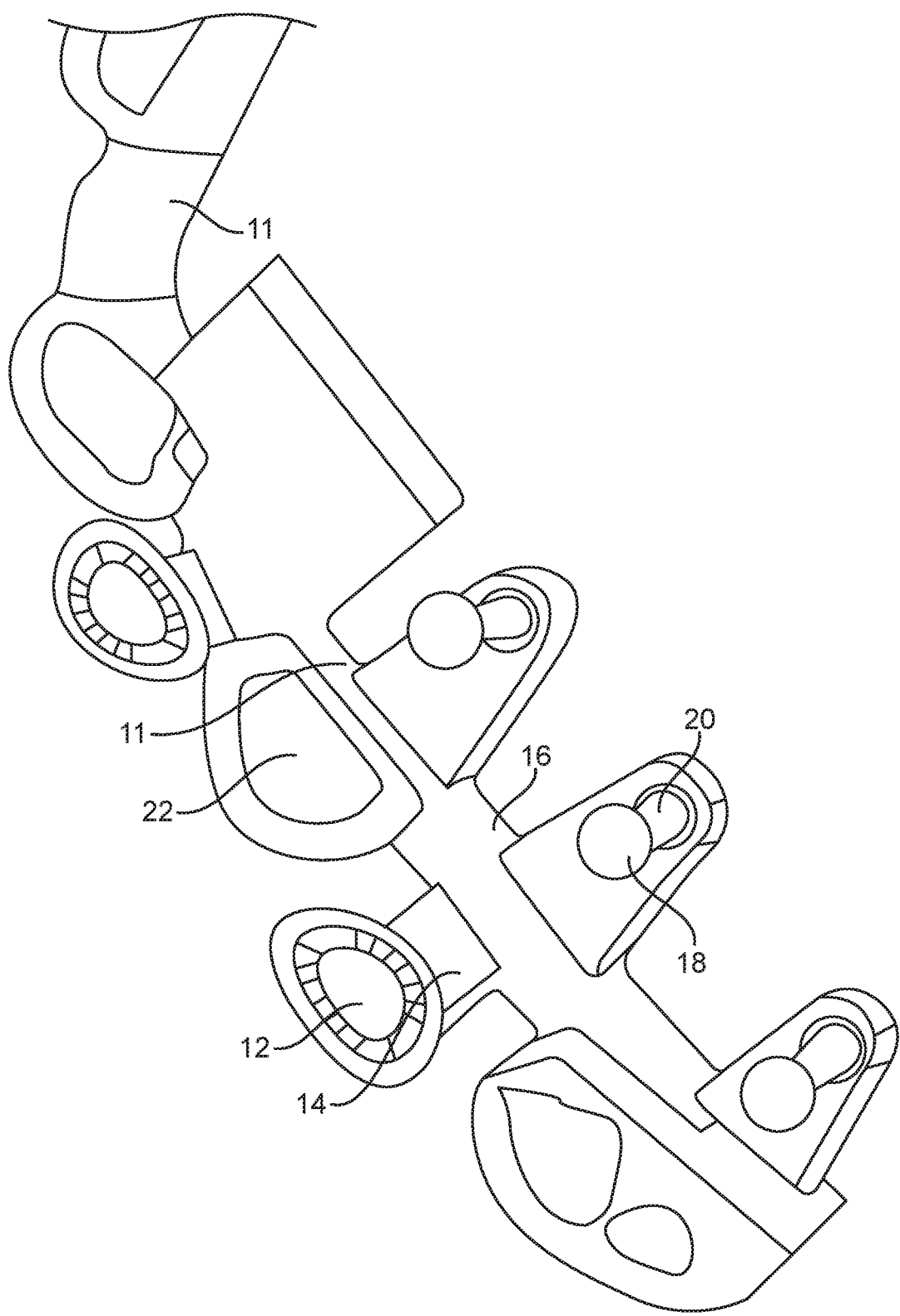
FIG. 6 shows a dental device, in accordance with some embodiments.

FIGS. 4 and 5 show an exemplary dental device 10 in connection with a 3-D digital model 25 of a patient's teeth and FIG. 6 shows a portion of the dental device 10 in a free standing configuration. The 3-D digital model 25 can be used as a basis to generate instructions to directly fabricate one or more components of the dental device 10, and in some embodiments the entire dental device 10. One or more the components of the device 10 can be directly fabricated to inhibit warpage, as described herein, and the device 10 may comprise at least one component directly fabricated with at least one layer to inhibit warpage, as described herein. The device 10 may comprise a surface 11, which has been directly fabricated on an additive manufacturing device, such as 3-D printer. These structures to decrease warpage can be identified on the 3-D model prior to directly fabricating the dental device 10. The surface 11 can be located on a surface or in directly fabricated layers of the device opposite a tooth engaging side of the device or between the tooth engaging side of the device and a tooth engaging side or surface of the device, and surface 11 can be identified on model 25. The surface 11 may comprise one or more burn in layers, as described herein, and the model 11 configured accordingly. The at least one layer to inhibit warpage may comprises structures located in the burn in layer, e.g. stress relieving structures, or structures located on different layers away from surface 11, as described herein. Each of these structures can be identified on the 3-D model prior to directly fabricating the dental device 10. For examples, the one or more elongate structures 17 can be configured for directly fabricating with structures to inhibit warpage, as described herein.

The dental device 10 comprises a body 16, a plurality of attachments 12, a plurality of supports 14 coupling the attachments 12 to the body 16, registration structures 18, and support structures 20 coupling the registration structures 18 to the body 16.

FIG. 4 shows a vestibular view of the model 25 of the patient's teeth and the dental device 10. As shown in FIG. 4, the dental device 10 is sized and shaped to complement a patient's teeth. The body 16 may include recesses 22 that receive an occlusal surface of at least one tooth. The recesses 22 may be shaped to complement the occlusal surface of a patient's tooth. The plurality of supports 14 may couple to the body 16 and extend around an attachment 12. A plurality of extensions 24 may extend from the support 14 to the attachment 12. The extensions 24 may have a weaker structure than the supports 14 such that the extensions 24 are breakable at a coupling point with the attachment 12. In use, after the attachment 12 is bonded to the tooth the extensions 24 may be broken at the coupling point and the dental device 10 may be removed from the patient's mouth, leaving the attachments 12 in place, and bonded to the patient's teeth.

FIG. 5 shows a lingual view of a patient's teeth and shows the registration structures 18 interacting with the patient's teeth. Each registration structure 18 is coupled to the body 16 by a support structure 20. The registration structure 18 and the recesses 22 may secure the dental device 10 within a patient's mouth to position the attachments 12 at a predetermined position.

FIG. 6 shows a dental device 10 after directly fabricating the device 10. The dental device 10 may be formed of a single structure or may be formed by a plurality of structures that are coupled together. For instance, each portion of the body 16 having a recess 22 for receiving a tooth may be formed separately from the remaining portions such that elements of the body 16 are joined by tooth receiving portions. The spacing between the attachments 12 and the registration structures 18 may be equal to the width of a patient's teeth at a particular location, or in some examples, the spacing may be slightly less that the width of a patients tooth such that an elastic deformation of the supports 14 or the support structures 20 is used to fit the dental device 10 over the patient's teeth. The resulting inward bias may help to position and hold the dental device 10 on the patient's teeth.

Figure 7:
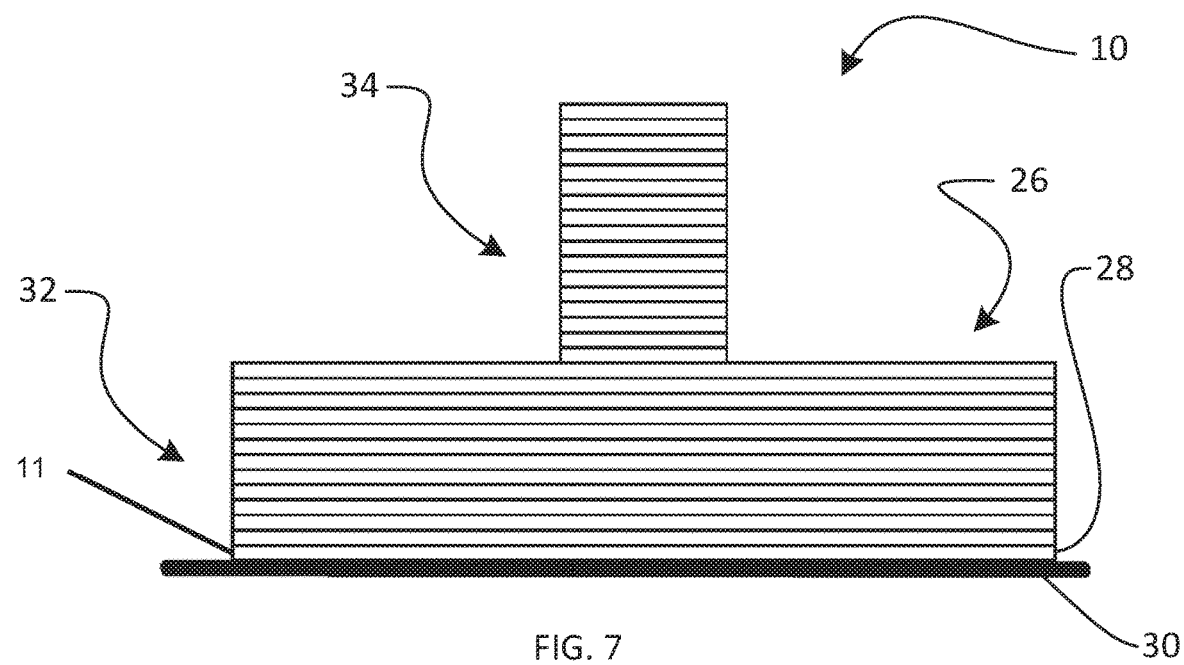
FIG. 7 shows example layers of a directly fabricated dental device, in accordance with some embodiments.

FIG. 7 shows a cross section of an example dental device 10 showing an example directly fabricated resin layers 26. The dental device 10 is shown as having a body 32 and a structure 34 extending away from the body 32. For example, structure 34 may comprise one or more of a support 14, a support structure 20 or one or more elongate structures 17. Although a single structure 34 is shown, a dental device may comprise a plurality of structures 34 extending from the body 32, for example. In some embodiments, a dental device may not have a support structure. In some embodiments, the dental device 10 may be an orthodontic aligner and the layers 26 may be layers forming the orthodontic aligner, including the sidewalls of one or more tooth receiving cavities.

The dental device 10 comprises a plurality of successively directly fabricated layers 26. A first layer 28 is directly fabricated directly on a build platform 30 and each successive layer is directly fabricated to each previous layer. If the build platform 30 is referenced as an X-Y plane with the Z axis extending away from the build platform 30, then the cross section of FIG. 7 is shown along a plane perpendicular to the build platform 30 and parallel to the Z axis and shows each successive layer building in the Z direction. Thus, each layer increases the dimension of the dental device in the Z direction as each directly fabricated resin layer is formed.

In the example of FIG. 7, the first layer 28 may comprise surface 11 of the dental device. In an orthodontic aligner, the first layer 28 may be a occlusal or incisal surface of an orthodontic aligner, and the device can be fabricated by directly fabricating each layer of resin with a similar amount of cross linking, so as to decrease deformation. In some embodiments, the amount of cross-linking may be controlled by adjusting the amount of light energy used to cure the resin. In some examples, the amount of light energy is selected to be just above the amount of light energy to adhere the first layer 28 to the build platform 30. The dose may be delivered at a rate of 0.1 W/cm^2. In some embodiments, about refers to amounts between 95% and 105% of the amount of light energy to adhere the first layer to the build platform. In some embodiment, the amount may be between 90% and 110% of the amount, for example, so as to decrease deformation. In some embodiments, the layers may be cured with an energy dose sufficient to cure the resin to its green strength. In some embodiments, the layers may be cured with a dose of between 95% and 105% or between 90% and 110% of the green strength dose. In some embodiments, the layers may be cured with a dose less than the green strength dose. In some embodiments, the first layer may be cured with a dose sufficient to adhere the layer to the build platform and subsequent layers may be cured with a dose to cure the resin to its green strength. In some embodiments, subsequent layers may be cured to less than their green strength, such as at least 5% less dose or 10% less dose.

Figure 8:
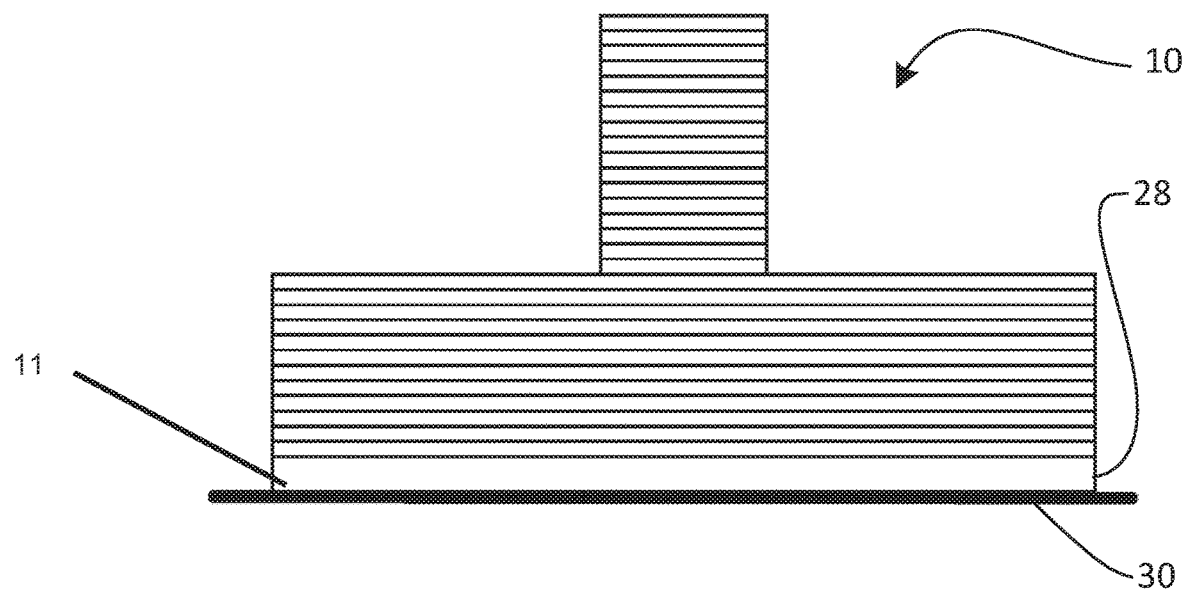
FIG. 8 shows example layers of a directly fabricated dental device, in accordance with some embodiments.

FIG. 8 shows a cross section of an example dental device 10 showing example layers for inhibiting warping of one or more components of the device, such as the body 16. In this example, the first layer 28 is directly fabricated using an amount of light energy selected to be above a minimum amount for adhering the first layer 28 to the build platform 30. Subsequent layers are cured with an amount of light sufficient to adhere the layer to the first layer 28 but maintain a consistent amount of light as layers are added. For example, the first layer 28 may be cured with a light dose sufficient to adhere the first layer to the build platform provided at a rate of 0.15 W/cm^2 and subsequent layers may be cured with a dose less than the dose of the first layer at a rate of 0.05 W/cm^2. In some examples, each subsequent layer may have an amount of light, or dose that is less than 20% of the amount of light used to cure the first layer. In some examples, each subsequent layer may have a light amount that is between 95% and 105% of a median light amount for the subsequent layers. This approach can be combined with approaches to inhibit deformation, as described herein.

Figure 9:
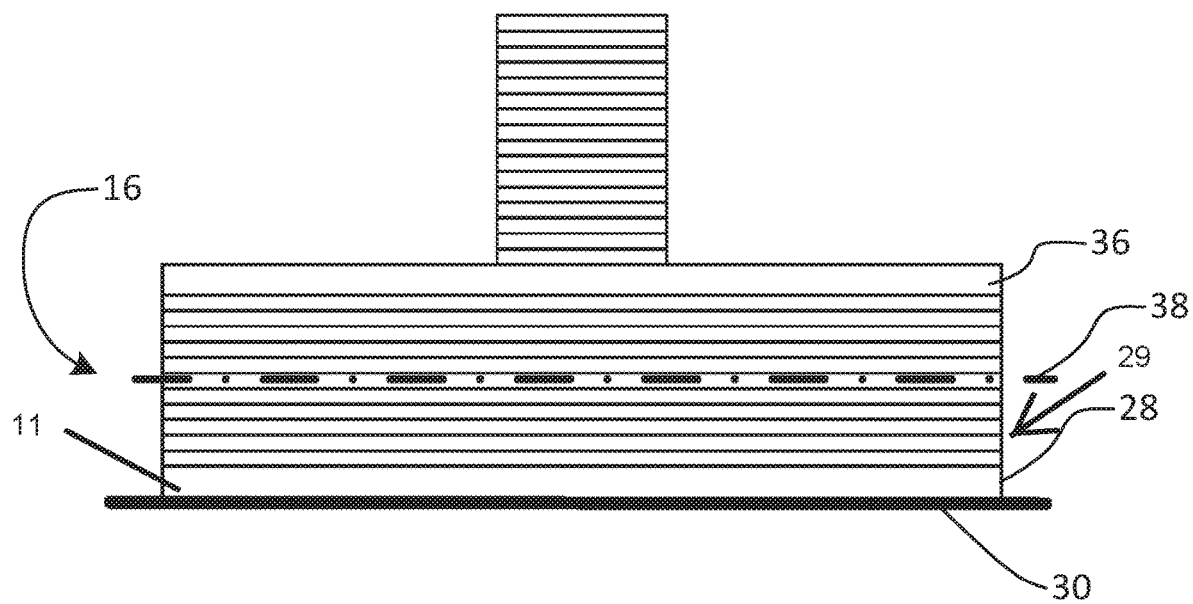
FIG. 9 shows example layers of a directly fabricated dental device, in accordance with some embodiments.

FIG. 9 shows a cross section of an example dental device 10 showing example layers for inhibiting warping of the body 16. In the example of FIG. 9, a first layer 28 is cured using an amount of light energy, a dose, sufficient to adhere the first layer 28 to the build platform 30. Another layer 36 can be directly fabricated similarly to first layer 28 so as to offset effects of stress of first layer 28. After first layer 28 is cured, a plurality of subsequent layers 29 is cured using an amount of light energy less than the amount used to cure the first layer 28. The layer 36 can be directly fabricated with an amount of light similar to layer 28. The layer 28 may comprise an outer layer 36 of the body 16 opposite the first layer 28. The layer 36 can be cured using an amount of light energy similar to the amount of the first layer 28. In some examples, the layers between the first layer 28 and the outer layer 36 may be fabricated with an amount of light energy that is less than 20% of the amount of light energy used to directly fabricate the first layer 28 and the outer layer 36, for example. Although layer 36 is shown as an outer layer, layer 36 may comprise an inner layer located a sufficient distance from layer 28 to decrease deformation. In some embodiments, layer 36 may be an intermediate layer between the first layer and a final layer.

In some examples, each of the layers between the first layer 28 and the outer layer 36 may be fabricated using a similar amount of light energy. In other examples, the amount of light energy for the layers may be varied, but with a symmetrical relationship about a midline 38 of the body 16. For example, after the first layer 28, each subsequent layer may be cured using an amount of light energy lower than the previous amount up to the middle layer or midline 38, between the first layer 28 and layer 36. Each subsequent layer would be cured with an amount of light energy that is similar to the opposite layer relative to the middle layer or midline 38. For example, if a first layer 28 were cured with a first dose amount, the second layer may be cured with a light energy of 20% lower dose than the first dose. A third, mid layer may be cured with a light energy of 50% lower dose than the first dose, a fourth layer opposite the second layer relative to the middle layer or midline 38 may be cured with an amount of 20% lower dose than the first dose, and the outer layer 36, which is opposite the first layer 28 relative to the midline 38 may be cured with an amount of light energy of the first dose. In some embodiments, each layer from the first layer to the midline may be cured with a dose that is stepwise reduced by 5%, 6%, 7%, 8%, 9%, 10%, 15% or 20% of the first dose and each layer from the midline to the outer layer may be cured with a dose that is stepwise increased by 5%, 6%, 7%, 8%, 9%, 10%, 15% or 20% of the first dose.

While this example lists only five layers, one of ordinary skill in the art will recognize that the symmetric pattern may be applied to any number of layers. In some embodiments, each successive layer between the first layer and the midline or middle layer is cured with successively lower amounts of energy and every successive layer between the midline or middle layer and the outer layer is cured with greater amounts of energy. In some embodiments, each subsequent layer between the first layer and the midline or middle layer is cured with 5%, 6%, 7%, 8%, 9%, 10%, 15% or 20% less than each previous layer. In some embodiments, each layer between the midline or middle layer and the outer layer is cured with 5%, 6%, 7%, 8%, 9%, 10%, 15% or 20% less than each subsequent layer.

Figure 10:
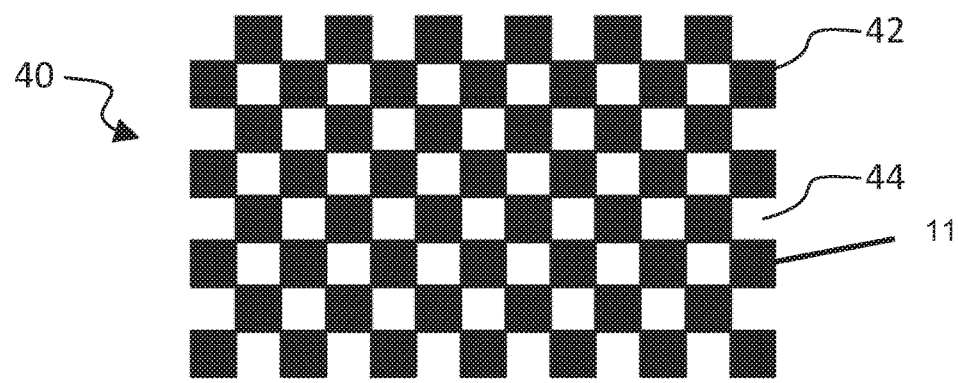
FIG. 10 shows example layer of a directly fabricated dental device, in accordance with some embodiments.

FIG. 10 illustrates an example of a layer 40 of a body 16 having a pattern for inhibiting warpage. The layer 40 is viewed perpendicular to the build platform 30 and may represent a view of a single layer. In some embodiments, the layer 40 is shown as a curing mask for a layer. In some examples, a single layer may be fabricated using the pattern shown, or in other examples, the pattern may be repeated for multiple layers to form a platform. The layer 40 includes first areas 42 of resin cured using a light amount or first dose suitable for adhesion to the build platform 30 or a previous layer and second areas 44 of resin cured with a second dose or lower light amount or left uncured. In some embodiments, the mask depicts areas 42 where light energy is provided to cure the layer and areas 44 where less or no light energy is provided to cure the layer. The first areas 42 may comprise surface 11 of the dental device 10. In some examples, in place of resin cured with a low light amount, the resin may be uncured such that no resin remains in the second areas when the part is removed from the build platform 30. The pattern of FIG. 10 alternates the first areas 42 and the second areas 44 in a checkerboard pattern. The pattern may cover the entire surface of the body contacting the build platform 30, or in some examples, the pattern may cover a limited area. These areas can be located on the first layer, for example. In some embodies, each layer formed of the object may be formed using a checkerboard, or alternating mask, such as that shown in FIG. 10, for the internal structure of the object. In some embodiments, the infill percentage of between first areas 42 and second areas 44 may be 50%, wherein the overall area of first areas and second areas is equal. In some embodiments, the infill percentage may be 10%, wherein the first areas represent 10% of the cross-sectional area of the layer, while second areas 44, may represent 90% of the cross-sectional area of the layer. In some embodiments, first areas may represent an amount equal to or greater than 5%, 10%, 15%, 20%, 25%, 30%, 35%, 40%, 45%, 50%, 55%, 60%, 65%, 70%, 75%, 80%, 85%, 90%, or 95% of the area of the layer while second areas represent an amount equal to or greater than 5%, 10%, 15%, 20%, 25%, 30%, 35%, 40%, 45%, 50%, 55%, 60%, 65%, 70%, 75%, 80%, 85%, 90%, or 95% of the area of the layer. In embodiments, wherein the first areas of a layer are at or greater than 50%, the layer is continuous, in that the greater cured areas are connected across the layer, while in layers wherein the checkerboard pattern of a layer includes first areas with less than 50%, then the first layers may not connect across the layer and the layer is discontinuous.

In some embodiments, a layer may include a third area cured at a third dose. The third area, similar to that of the first and second layers, may include an area equal to or greater than 5%, 10%, 15%, 20%, 25%, 30%, 35%, 40%, 45%, 50%, 55%, 60%, 65%, 70%, 75%, 80%, 85%, 90%, or 95% of the layer.

Figure 11:
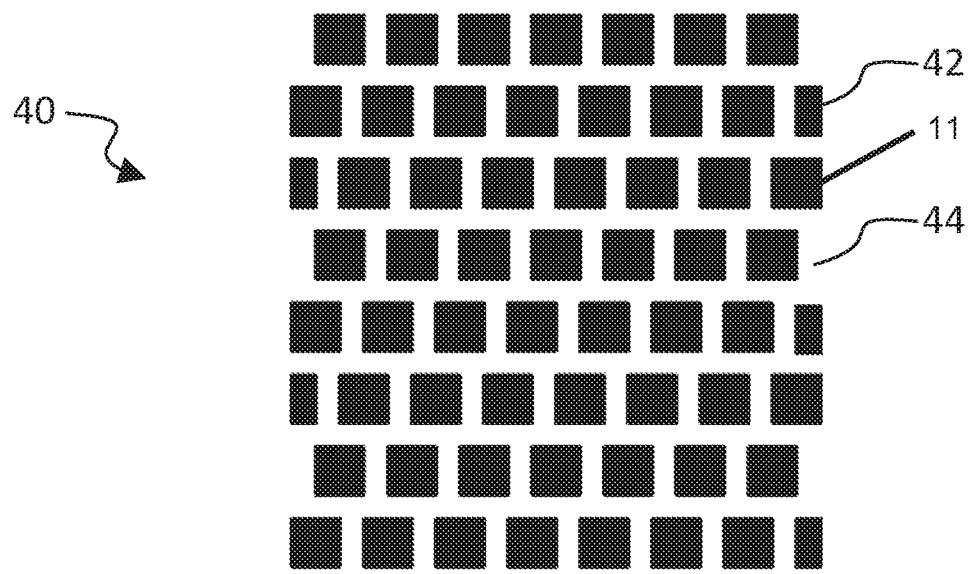
FIG. 11 shows example layer of a directly fabricated dental device, in accordance with some embodiments.

FIG. 11 illustrates an example layer or cure mask 40 of a body 16 having a pattern suitable for inhibiting warpage of a dental device 10. The pattern of FIG. 11 includes first areas 42 of resin cured with a high light amount, such as a dose sufficient for the resin to achieve green strength or handling strength, and second areas 44 of resin having a low light amount or no light amount. The pattern of FIG. 11 is a tiled pattern, in which the first areas 42 of resin do not contact one another and are separated by the second areas 44 of resin having low or no curing. These areas 42 may comprise areas of the burn in layer, and may comprise areas of surface 11 of device 10. Areas 42 may represent an amount equal to or greater than 5%, 10%, 15%, 20%, 25%, 30%, 35%, 40%, 45%, 50%, 55%, 60%, 65%, 70%, 75%, 80%, 85%, 90%, or 95% infill in a layer. Layer or mask 40 in FIG. 11 is discontinuous in all directions. In some embodiments, the layer or mask 40 may be used for any of the layers of a directly fabricated device.

In some embodiments, a similar pattern shown in mask 40 may be used to form the internal portion of each layer of a device. In such embodiments, areas 42 of the layers form internal columns extending in the Z direction in the internal structure of a device, such as the sidewalls of an orthodontic aligner.

Figure 12:
FIG. 12 shows example layer of a directly fabricated dental device, in accordance with some embodiments.

FIG. 12 illustrates an example layer or cure mask 40 of a body 16 having a pattern suitable for inhibiting warpage of a dental device 10. The pattern of FIG. 12 comprises stripes of first areas 42 of resin cured with a high light amount, such as a dose sufficient for the resin to achieve green strength or handling strength, and stripes of second areas 44 of resin having a low light amount or no light amount. The pattern of FIG. 12 is a striped pattern. In some examples, the stripes of first areas 42 may run perpendicular to the longest dimension of the body 16 adhered to the build platform 30. For example, if the body has a length greater than a width, then the stripes 42 may run the width of the body. These areas 42 may comprise areas of the burn in layer, and may comprise areas of surface 11 of device 10. Areas 42 may represent an amount equal to or greater than 5%, 10%, 15%, 20%, 25%, 30%, 35%, 40%, 45%, 50%, 55%, 60%, 65%, 70%, 75%, 80%, 85%, 90%, or 95% infill in a layer. In some embodiments, the layer or mask 40 may be used for any of the layers of a directly fabricated device.

In some embodiments, a similar pattern shown in mask 40 may be used to form the internal portion of each layer of a device. In such embodiments, areas 42 of the layers form internal wall extending in the Z direction in the internal structure of a device, such as the sidewalls of an orthodontic aligner. The walls may be said to be continuous along the length of the wall in the internal structure of the device, but discontinuous in directions between walls.

Figure 13:
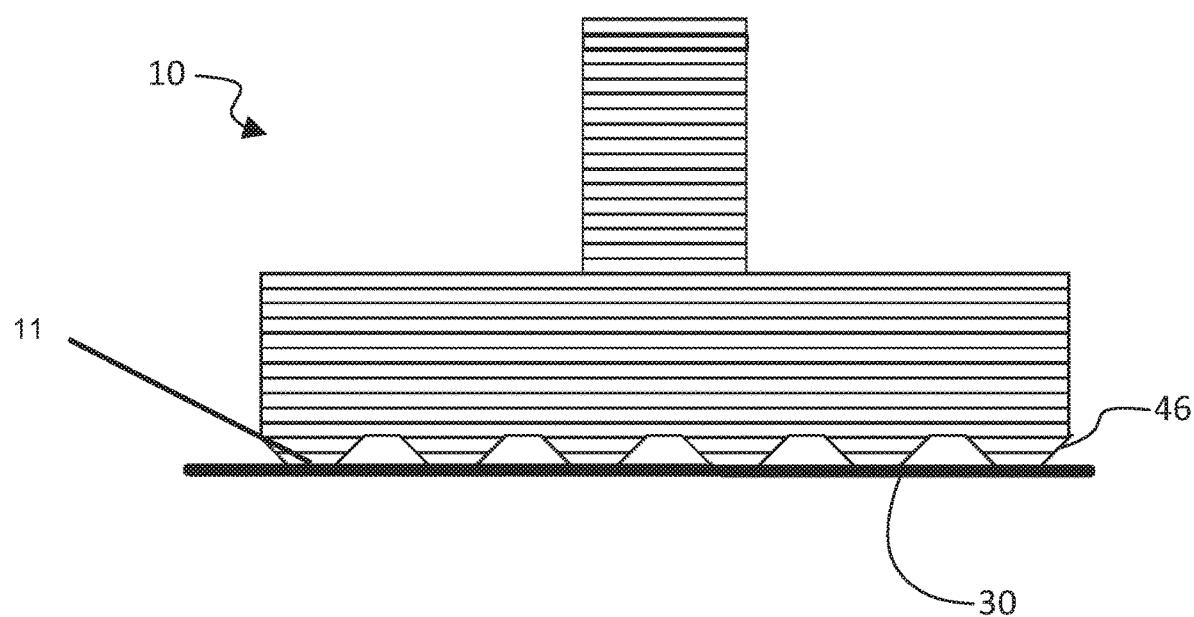
FIG. 13 shows example layer of a directly fabricated dental device, in accordance with some embodiments.
Figure 16:
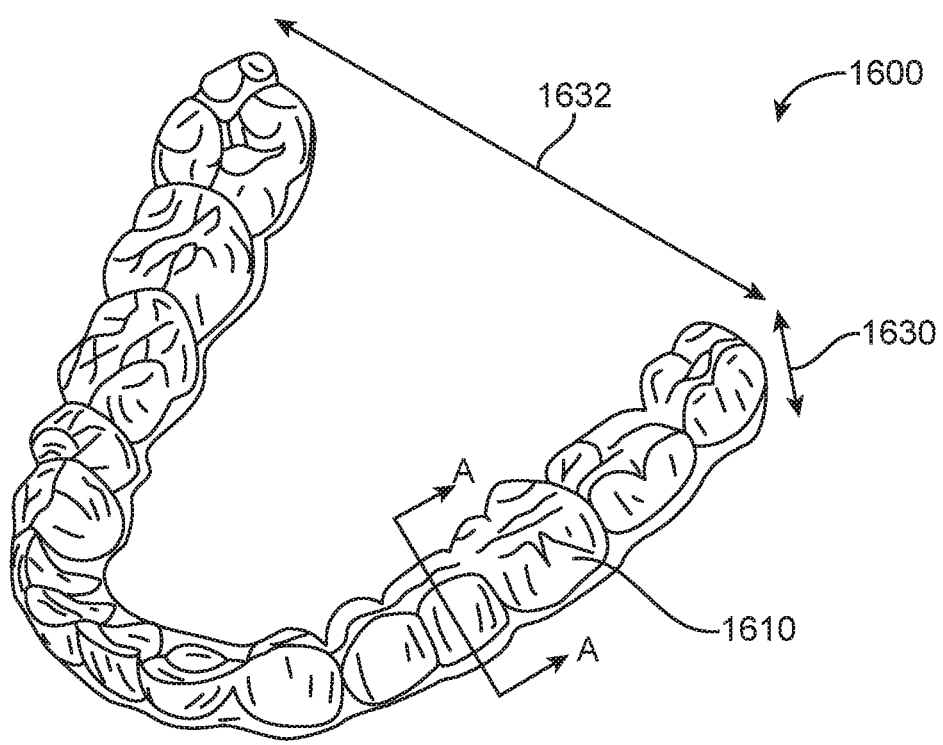
FIG. 16 shows a dental device, in accordance with some embodiments.

FIG. 13 illustrates an example cross section of a dental device. The dental device of FIG. 13 includes tapered platforms 46 that the reduce the amount of resin contacting the build platform 30. The tapered platform structures 46 may be arranged in any of the patterns described in reference to FIGS. 10 to 12. The tapered platform structures 46 may extend through a plurality of layers. A plurality of grooves may extend between the plurality of platform structures 46. In some examples, the layers may be cured using the previously described techniques to decrease deformation, e.g. warpage. These areas 42 may comprise areas of the burn in layer, and may comprise areas of surface 11 of device 10. These areas 42 may comprise areas of the burn in layer, and may comprise areas of surface 11 of device 10. With reference to FIG. 16, in orthodontic aligner 1600 is depicted. The orthodontic aligner 1600 may include a plurality of tooth receiving cavity 1610. The orthodontic aligner 1600 may be fabricated using additive manufacturing techniques such as those described herein. The additive manufacturing techniques described herein for reducing warpage and stress the fabricated part are well suited for devices having a low aspect ratio wherein the height along a build direction 1630 such as the Z axis is greater than the cross-sectional size 1632 of the device in an X-Y plane parallel to the build plate. The aspect ratio may be less than 0.25 (the height being one-fourth of the cross-sectional size), less than 0.2, less than 0.15, less than 0.1, or less than 0.05. The cross-sectional size may be a greatest distance between locations of the device within an X-Y plane.

Figure 17:
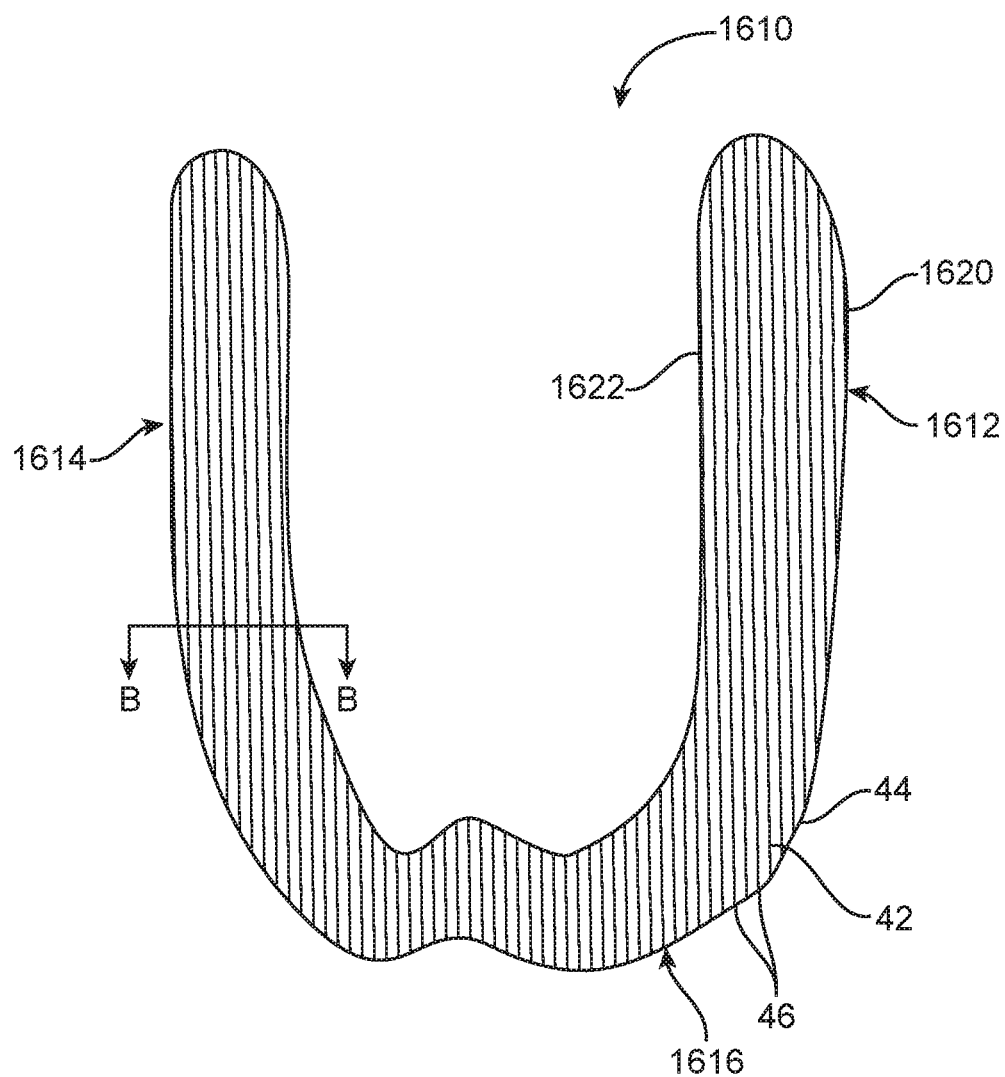
FIG. 17 shows a cross section of the dental device of FIG. 16, in accordance with some embodiments.

FIG. 17 depicts a cross-section of the orthodontic aligner 1600 of FIG. 16 taken along A-A of a tooth receiving cavity 1610. The tooth receiving cavity 1610 includes a buccal sidewall 1620 a lingual sidewall 1614 and an occlusal wall 1616. Each sidewall includes an outward facing surface 1620 and an inward facing surface 1622. The cross-section depicted in FIG. 17 shows how the internal structure or infill may be formed or cured such that the material reaches is green strength. In particular, the tooth receiving cavity structure is formed using one or more of the masks discussed above. For example, the mask 40 depicted in FIG. 11. The first areas 42 of each layer form columns 46 of green strength material within the structure of the aligner 1600 while the second areas 44 form portions of uncured or less cured resin between the columns 46. In some embodiments, the columns may intersect the outer surfaces of the structure, such as the outward facing surface 1620 and the inward facing surface 1622. In some embodiments, one or more of the infill columns 46 may begin at a first end on an external surface of the aligner and end at a second end on an external surface of the aligner. In some embodiments, the orthodontic aligner 1600 is formed such that the lessor uncured volumes of resin corresponding to second areas 44 are held within the aligner between its external surfaces. After formation an curing of the external surfaces 1620, 1622 and the first areas 42 of the aligner to a green strength, the aligner may be subjected to a secondary curing process wherein the uncured material or resin corresponding to the areas 44 are cured along with the first areas 42 to an ultimate or final strength.

Figure 18:
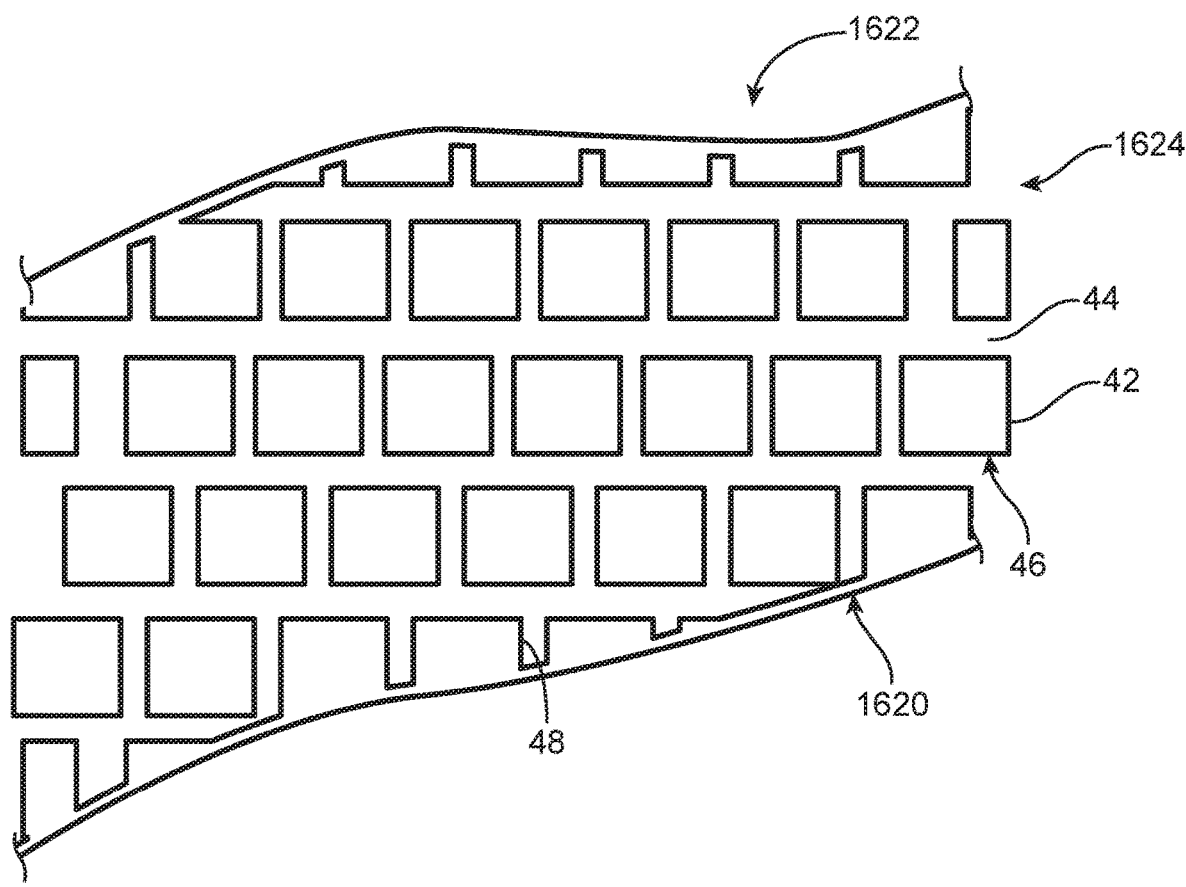
FIG. 18 shows a cross section of the dental device of FIG. 16, in accordance with some embodiments.

FIG. 18 shows a cross section of the aligner along line B-B of FIG. 17. The cross-section of the aligner 1600 shows a single layer of the aligner in Annex light plane parallel to the plane of a build platform on which the aligner 1600 is formed. The infill pattern 1624 may be similar to the mask 40 shown in FIG. 11. The cured or green strength portions of the aligner are represented by first areas 42 and perimeters 1620 and 1622 that represent the outer or external surfaces of the aligner. In some embodiments, first areas 42 may be intersected by the perimeters 1620, 1622. For example, first area 48 is intersected by perimeters 1620 such that the first area 48 and the perimeters 1620 are continuous with each other.

Figure 19:
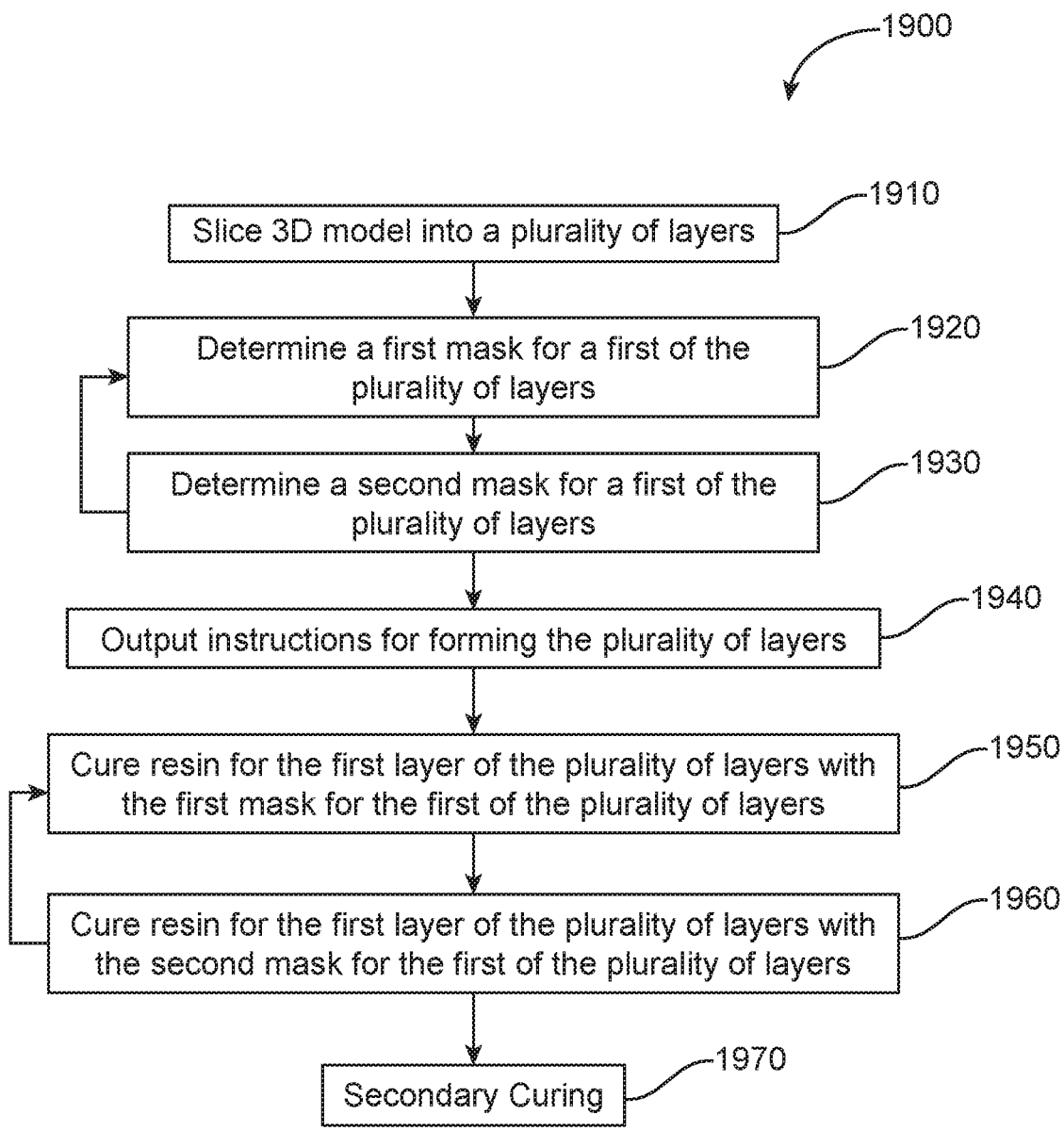
FIG. 19 shows a method of additively manufacturing a dental device, in accordance with some embodiments.

FIG. 19 shows a method 1900 for fabricating devices described herein. At block 1910 a three-dimensional model of the device, such as an orthodontic device, is sliced into a plurality of layers. Slicing process divides the three-dimensional model into a plurality of two-dimensional layers each representing a portion of the height of the device represented by the three-dimensional model. For example, if a layer height is 10 μm then each layer would represent a 10 μm thick portion of the device.

At block 1920 a first mask for a first of the plurality of layers is determined. A mask may be a two-dimensional, planar, representation of the cross-section of the device at a particular layer height. For a first layer of a model divided into 10 μm layer heights, a first layer may represent the cross-sectional structure of the device at a height between zero and 10 μm. A first mask may include a projected image of an external perimeter and an infill for a first curing operation for first areas of the first layer. At block 1920, a light energy dose and radiation strength may be determined for curing first areas of the device within the first layer. The light energy dose may be sufficient to cure a resin to its green strength and adhere the resin to the build plate. For subsequent layers the light energy dose may be sufficient to cure the resin to its green strength and adhere the resin to the previously cured layer.

At block 1930 a second mask for the first layer of the plurality of layers be determined. The second mask may include a projected image of an infill for a second curing operation for second areas of the first layer. In some embodiments, a second mask may include the perimeters, the first areas, and the second areas. At block 1940, a light energy dose and radiation strength may be determined for curing second areas of the device within the first layer. The light energy dose may be less than sufficient to cure a resin to its green strength. In some embodiments, the curing dose provided during exposure of the first mask may be insufficient for the material to reach its green strength, however the first areas may be cured to their green strength upon receiving a second dose according to the second mask that includes a mask of the first areas, the second areas, and the perimeters.

After completion of step 1930 the process may repeat the steps 1920 and 1930 for each of the layers of the plurality of layers of the three-dimensional model.

At block 1940 instructions performing the plurality of layers may be output. Outputting the instructions may include storing the instructions or sending them to a fabrication machine, such as an additive manufacturing machine.

At block 1950 a first layer of the plurality of layers of a device is cured using the first mask for the first dose. At block 1950 the first layer of the plurality of layers of the device is cured using the second mask at the second dose. Blocks 1950 and 1960 may be repeated for each of the plurality of layers of the device.

At block 1970 a postprocessing or secondary curing process may occur. For example, after the formation of each of the layers the device in blocks 1950 and 1960, the device may be subject to a secondary curing process by which the resin in the device including both the green strength rather than resin and the less than green strength resin are cured to their final or ultimate strength.

Figure 14:
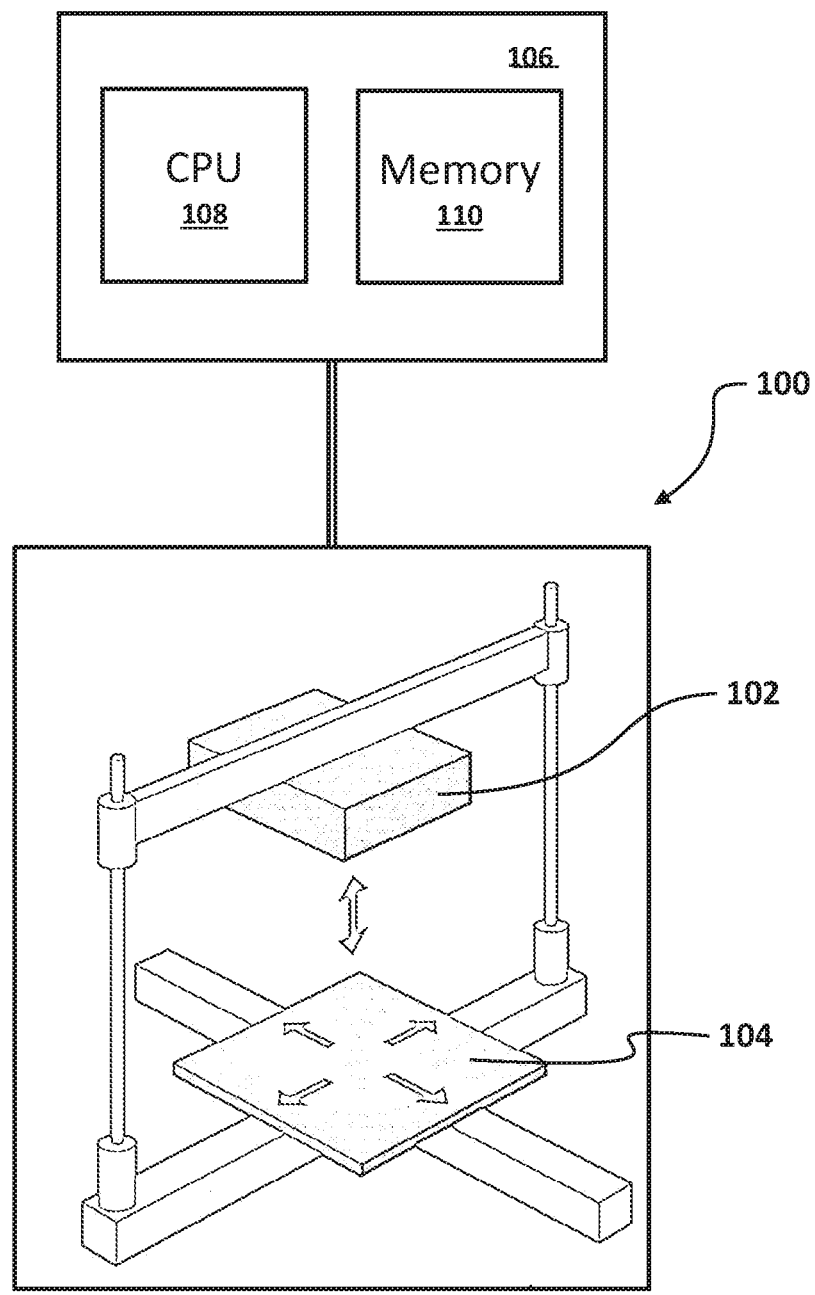
FIG. 14 shows a schematic of a directly fabrication machine, in accordance with some embodiments.

With reference to FIG. 14 shows an example schematic of an additive manufacturing device 100, such as 3D printer. The additive manufacturing device 100 comprises a print head 102, such as a projector, and a build platform 104. The additive manufacturing device 100 comprises a processor 106, which includes a central processing unit (CPU) 108 and memory 110. The processor 106 can be configured with instructions to directly fabricate the appliance, as described herein. The instructions may comprise instructions to directly fabricate each of the plurality of layers along a direction of deposition in order to form the precursor appliance, as described herein. During the direct fabrication process the print head 102 prints each of the plurality of layers and the separation distance between the print head 102 and the build platform 104 increases. In some embodiments the printhead may be a projector the projected light according to the masks discussed herein.

Although FIG. 14 shows the additive manufacturing device 100 in a vertical orientation with a print head 102 located above a build platform 104, other types of additive manufacturing devices are suitable for use with the disclosed embodiments. For example, the print head 102 can be located beneath the build platform 104. In general, the direct fabrication process forms a single planar layer at a time that is approximately parallel to the build platform 104. After forming a layer, the print head 102 may move away from the build platform 104 and a new layer is formed. Alternatively or in combination, the build platform 104 may move away from the print head 102. Each successive layer is built on the previous layer, for example on top of or beneath the previous layer. Although the additive manufacturing device 100 100 is shown in a vertical orientation, other orientations can be used to one or more of the components as described herein, for example horizontal or oblique orientations.

Figure 15:
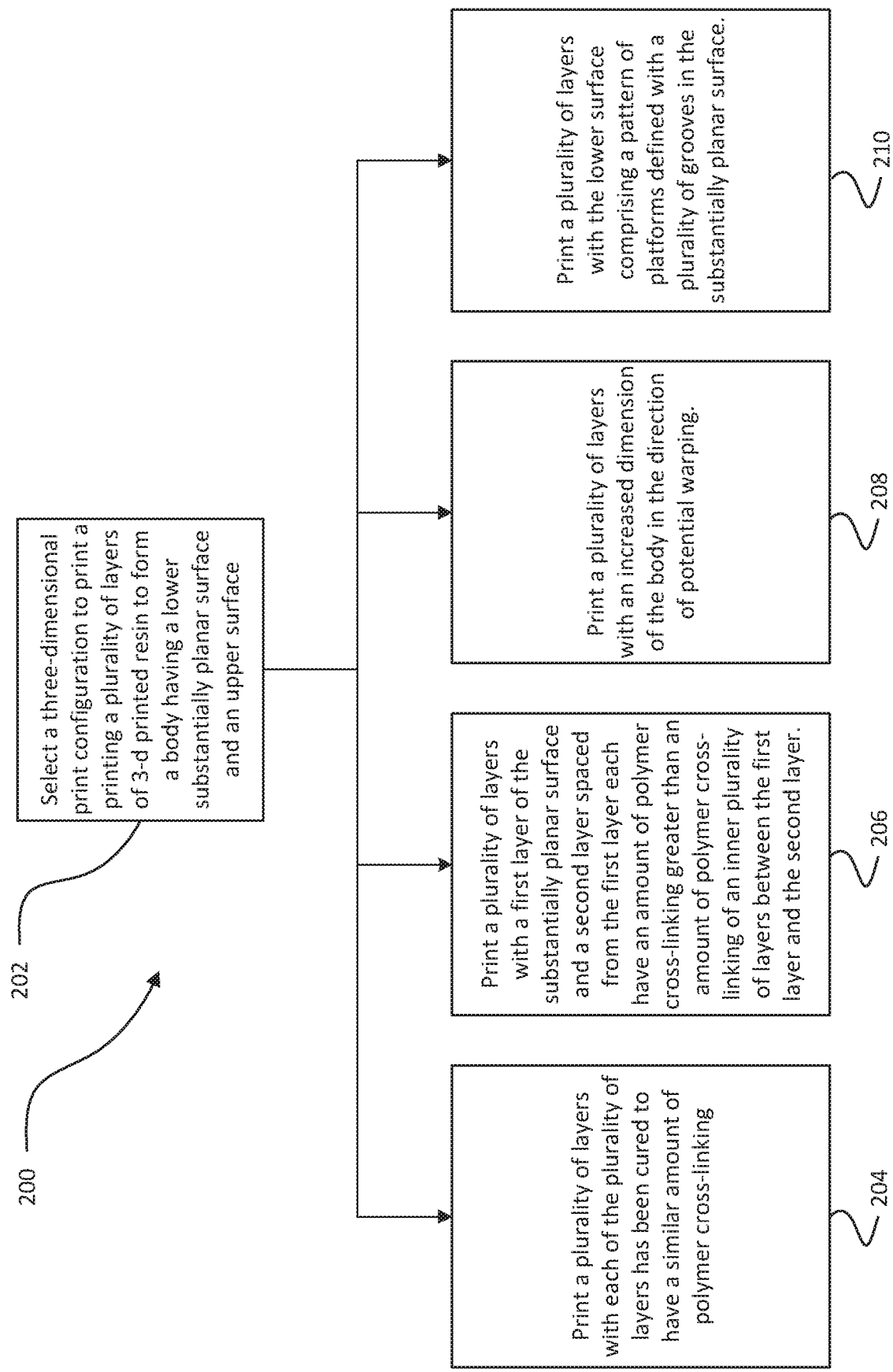
FIG. 15 shows a schematic of a method for manufacturing a dental device, in accordance with some embodiments.

FIG. 15 shows a schematic of a method 200 for manufacturing a dental device. At step 202, direct fabrication configuration is selected to directly fabricate a plurality of layers of resin to form a body having a lower substantially planar surface and an upper surface. In some examples, at step 204, a plurality of layers are directly fabricated with each of the plurality of layers cured to have a similar amount of polymer cross-linking. In some examples, at step 206, a plurality of layers our directly fabricated with a first layer of the substantially planar surface and a second layer spaced from the first layer, in which each of the first layer and the second layer has an amount of polymer cross-linking greater than an amount of polymer cross-linking of a plurality of inner layers between the first layer and the second layer. In some examples, at step 208, a plurality of layers are directly fabricated with an increased dimension of the body in the direction of potential warping, so as to decrease deformation, e.g. in the Z direction as described herein. In some examples, at step 210, a plurality of layers are directly fabricated with the lower surface comprising a pattern of platforms defined with a plurality of grooves in the substantially planar surface.

Although FIG. 15 shows a method of manufacturing a dental device, in accordance with some embodiments, a person of ordinary skill in the art will recognize many adaptations and variations. For example, the steps can be performed in a different order, some of the steps repeated and some of the steps removed.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

This disclosure also includes the following numbered clauses.

Clause 1. An oral device, comprising: a plurality of layers of cured photopolymer material forming a body comprising a lower, substantially planar surface and an upper surface; wherein at least a first one of the plurality of layers is cured with a first dose to a first strength and a at least a second one of the plurality of layers is cured to a second dose to a second strength to inhibit warpage of the body.

Clause 2. The oral device of clause 1, further comprising at least one support and at least one attachment for a tooth, wherein the at least one support couples the at least one attachment to the body.

Clause 3. The oral device of clause 1, wherein each of the plurality of layers has been cured to have a similar amount of polymer cross-linking.

Clause 4. The oral device of clause 3, wherein each layer of the plurality of layers has an amount of polymer cross-linking within a range of about 90% and 110% of an average amount of polymer cross-linking of the plurality of layers.

Clause 5. The oral device of clause 3, wherein an initial build layer of the plurality of layers has an amount of polymer cross-linking suitable for adhering to a build platform.

Clause 6. The oral device of clause 1, wherein an initial layer of the substantially planar surface and a second layer spaced from the first layer each have an amount of polymer cross-linking greater than an amount of polymer cross-linking of an inner plurality of layers between the first layer and the second layer.

Clause 7. The oral device of clause 6, wherein the initial layer and the second layer have a similar amount of polymer cross-linking.

Clause 8. The oral device of clause 6, wherein each layer of the inner plurality of layers has a similar amount of polymer cross-linking.

Clause 9. The oral device of clause 8, wherein each layer of the inner plurality of layers has an amount of polymer cross-linking between 90% and 110% of an average amount of polymer cross-linking of the inner plurality of layers and wherein the first layer and the second layer each has an amount of polymer cross-linking between 90% and 110% of an average amount of polymer cross-linking of the first layer and the second layer and wherein the average of the inner plurality of layers is less than the average of the first layer and the second layer by at least about 10%.

Clause 10. The oral device of clause 1, wherein the body has a width, a length, and a thickness, wherein the thickness is at least 0.25 times the length of the body.

Clause 11. The oral device of clam 1, wherein the body has a width, a thickness, and a length, wherein the thickness is no more than 0.25 times the length of the body.

Clause 12. The oral device of clause 1, wherein the lower surface comprises a pattern of platforms defined with a plurality of grooves in the substantially planar surface.

Clause 13. The oral device of clause 12, wherein the pattern comprises one or more of a checkerboard pattern, a tile pattern, or a stripe pattern.

Clause 14. The oral device of clause 12, wherein the platforms cover between twenty-five percent and seventy-five percent of a surface area bounded by an outer perimeter of the pattern of platforms.

Clause 15. The oral device of clause 12, wherein the platforms comprise a taper that widens from a face of a platform towards the upper surface.

Clause 16. The oral device of clause 1, wherein the lower surface has a pattern comprising areas of cured photopolymer material having a higher amount of polymer cross-linking and cured photopolymer material having a lower amount of polymer cross-linking.

Clause 17. The oral device of clause 1, wherein the body comprises an attachment for a tooth.

Clause 18. The oral device of clause 17, wherein the attachment for the tooth comprises a substantially flat surface for engaging the tooth and the substantially flat surface comprises the substantially planar surface.

Clause 19. The oral device of clause 1, wherein the body comprises an elongate structure operable to position an attachment for a tooth.

Clause 20. The oral device of clause 19, wherein the body has a length and a width, wherein the length is at least four times the width.

Clause 21. The oral device of clause 19, further comprising a registration structure for positioning the oral device and a support structure coupling the registration structure to the body.

Clause 22. The oral device of clause 21, wherein the registration structure and the attachment couple to opposite sides of the oral device.

Clause 23. The oral device of clause 21, wherein the at least one layer to inhibit warpage extends through two or more of the body, the support structure, or the support.

Clause 24. The oral device of clause 21, wherein a cured layer extends through the attachment and the registration structure.

Clause 25. A method of manufacturing an oral device, comprising: directly fabricating a plurality of layers of resin to form a body comprising a lower substantially planar surface and an upper surface; and wherein the lower, planar surface is fabricated directly to a build platform and wherein at least a first one of the plurality of layers is cured with a first dose to a first strength and a at least a second one of the plurality of layers is cured to a second dose to a second strength to inhibit warpage of the body.

Clause 26. The method of clause 25, wherein the oral device further comprises at least one attachment and at least one support coupling the attachment to the body, wherein the method further comprising directly fabricating a plurality of support layers to form the support and a plurality of attachment layers to form the attachment.

Clause 27. The method of clause 25, further comprising directly fabricating each of the plurality of layers with a similar amount of polymer cross-linking.

Clause 28. The method of clause 25, further comprising directly fabricating a first layer at the planar surface and a second layer at the upper surface with a greater amount of polymer cross-linking than an amount of polymer cross-linking of an inner plurality of layers between the first layer and the second layer.

Clause 29. The method of clause 28, further comprising directly fabricating the first layer and the second layer with the same amount of polymer cross-linking.

Clause 30. The method of clause 28, further comprising directly fabricating each layer of the inner plurality of layers with the same amount of polymer cross-linking.

Clause 31. The method of clause 25, wherein the body has a width, length, and thickness, wherein the thickness is at least 0.25 times the length of the body.

Clause 32. The method of clause 25, further comprising directly fabricating the lower surface with a pattern of platforms.

Clause 33. The method of clause 32, wherein the pattern comprises one or more of a checkerboard pattern, a tile pattern, or a stripe pattern.

Clause 34. The method of clause 32, further comprising directly fabricating the platforms to have an area between twenty-five percent and seventy-five percent of an area bounded by a perimeter of the plurality platforms.

Clause 35. The method of clause 32, further comprising directly fabricating the platforms to have a taper that widens from a face of a platform towards the upper surface.

Clause 36. The method of clause 32, wherein the lower surface has a pattern comprising areas of resin having a high amount of polymer cross-linking and areas of resin having a lower amount of polymer cross-linking.

Clause 37. The method of clause 36, wherein the pattern comprises one or more of a checkerboard pattern, a tile pattern, or a stripe pattern.

Clause 38. A method of fabricating a device, the method comprising: slicing a 3D model of the device into a plurality of layers; determining a first mask of a first area for a first of a plurality of layers; determine a second mask of a second area for the first of the plurality of layers; and outputting instructions for forming a plurality of layers.

Clause 39. The method of clause 38, wherein determining the first mask includes determining a first curing dose.

Clause 40. The method of clause 39, wherein determining a second mask includes determining a second curing dose, less than the first curing dose.

Clause 41. The method of clause 40, wherein the first curing dose is sufficient to cure resin of the first areas to its green strength.

Clause 42. The method of clause 40, wherein the second curing dose is insufficient to cure resin of the second areas to its green strength.

Clause 43. The method of clause 42, wherein the first area includes perimeters of the first of the plurality of layers and the second area includes the first area and the perimeters, and wherein the first dose is insufficient to cure resin of the first areas to its green strength and the second dose second dose is sufficient cures the resin of the first areas to the green strength but is insufficient to cure the second areas to the green strength.

Clause 44. The method of clause 38, further comprising: determining first and second masks for each of the remaining plurality of layers.

Clause 45. A method of fabricating a dental appliance, the method comprising: receiving instructions for curing a plurality of layers to fabricate the dental appliance; curing first areas of resin for a first layer of the plurality of layers with a first mask; and curing second areas of resin for the first of the plurality of layers with a second mask.

Clause 46. The method of clause 45, wherein the first areas are cured with a first dose of light energy.

Clause 47. The method of clause 46, wherein the second areas are cured with a second dose of light energy.

Clause 48. The method of clause 46, wherein the first curing dose is sufficient to cure resin of the first areas to its green strength.

Clause 49. The method of clause 48, wherein the second curing dose is insufficient to cure resin of the second areas to its green strength.

Clause 50. The method of clause 46, wherein the first area includes perimeters of the first of the plurality of layers and the second area includes the first area and the perimeters, and wherein the first dose is insufficient to cure resin of the first areas to its green strength and the second dose second dose is sufficient cures the resin of the first areas to the green strength but is insufficient to cure the second areas to the green strength.

Clause 51. The method of clause 38, further comprising: determining first and second masks for each of the remaining plurality of layers.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. A method of manufacturing an orthodontic placement device, comprising:
   directly fabricating an orthodontic placement device comprising a first plurality of layers of resin to form a body comprising a lower substantially planar surface, an upper surface, and comprising a plurality of registration structures shaped to engage a surface of a patient's detention extending between the lower substantially planar surface and the upper surface, and a second plurality of layers of resin to form a plurality of platforms that extend from a build plate to the lower substantially planar surface by:
   forming a first of the first plurality of layers of resin with a first cure dose with a first mask including outer perimeters for forming the outer perimeters of the orthodontic placement device and a first area of infill having an infill pattern, the first of the first plurality of layers forming the lower substantially planar surface,
   determining a second cure dose and second mask for the first of the first plurality of layers of resin to compensate for warpage, the second mask including a second area of infill,
   curing the first of the first plurality of layers with the second cure dose with the second mask, wherein the first and second cure doses cure at least the first of the first plurality of layers to a first strength and wherein at least a second one of the first plurality of layers is cured to a second strength to inhibit warpage of the body,
   forming the second plurality of layers of resin, the second plurality of layers forming the plurality of platforms that extend from the build plate to each form a taper that widens from the build plate towards the lower substantially planar surface, wherein grooves separate the plurality of platforms from each other.

2. The method of claim 1, wherein the orthodontic placement device further comprises at least one orthodontic attachment having a surface shape that is complementary to a surface of the tooth to which it is to be bonded and at least one support extending between the attachment and the body, coupling the orthodontic attachment to the body, wherein the method further comprises:
   directly fabricating a plurality of support layers to form the support and a plurality of attachment layers to form the orthodontic attachment.

3. The method of claim 1, further comprising directly fabricating each of the first plurality of layers with a similar amount of polymer cross-linking.

4. The method of claim 1, further comprising directly fabricating the second one of the first plurality of layers to form the upper surface, wherein the first of the first plurality of layers and the second of the plurality of layers are fabricated with a greater amount of polymer cross-linking than an amount of polymer cross-linking of an inner plurality of layers between the first of the first plurality of layers and the second one of the first plurality of layers.

5. The method of claim 4, further comprising directly fabricating the first of the first plurality of layers and the second one of the first plurality of layers with the same amount of polymer cross-linking.

6. The method of claim 4, further comprising directly fabricating each layer of the inner plurality of layers with the same amount of polymer cross-linking.

7. The method of claim 1, wherein the body has a width, length, and thickness, wherein the thickness is at least 0.25 times the length of the body.

8. The method of claim 1, wherein the plurality of platforms are arranged in a pattern.

9. The method of claim 8, wherein the pattern comprises one or more of a checkerboard pattern, a tile pattern, or a stripe pattern.

10. The method of claim 8, further comprising directly fabricating the plurality of platforms to have an area between twenty-five percent and seventy-five percent of an area bounded by a perimeter of the platforms.

11. The method of claim 8, wherein the lower surface has areas of resin having a high amount of polymer cross-linking and areas of resin having a lower amount of polymer cross-linking.

12. The method of claim 11, wherein the pattern comprises one or more of a checkerboard pattern, a tile pattern, or a stripe pattern.

13. The method of claim 1, further comprising postprocessing the orthodontic placement device comprising the first and second plurality of layers of resin by subjecting the orthodontic placement device comprising the first and second plurality of layers of resin to secondary curing.

* * * * *